United States Patent
Regener (10) Patent No.: US 11,815,205 B2
(45) Date of Patent: Nov. 14, 2023

(54) COUPLING ASSEMBLY FOR PIPES

(71) Applicant: MANN+HUMMEL GmbH, Ludwigsburg (DE)

(72) Inventor: Guido Regener, Klein Denkte (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/547,314

(22) Filed: Dec. 10, 2021

(65) Prior Publication Data
US 2022/0186864 A1  Jun. 16, 2022

(30) Foreign Application Priority Data
Dec. 11, 2020 (DE) ................... 10 2020 133 094.4

(51) Int. Cl.
*F16L 27/06* (2006.01)
*F16L 27/10* (2006.01)
*F16L 27/113* (2006.01)
*F16L 37/52* (2006.01)

(52) U.S. Cl.
CPC ........... *F16L 27/1017* (2013.01); *F16L 27/06* (2013.01); *F16L 27/113* (2013.01); *F16L 37/52* (2013.01)

(58) Field of Classification Search
CPC ......... F16L 27/04; F16L 27/06; F16L 27/073; F16L 37/52; F16L 37/53
See application file for complete search history.

(56) References Cited

U.S. PATENT DOCUMENTS

| | | | |
|---|---|---|---|
| 2,158,131 A | 5/1939 | Laurent | |
| 2,165,164 A * | 7/1939 | Waters | F16L 37/52 285/271 |
| 2,417,250 A * | 3/1947 | Harvey | F16L 27/04 285/322 |
| 2,475,834 A | 7/1949 | Harvey | |
| 2,556,659 A * | 6/1951 | Patterson | F16L 37/52 285/317 |
| 3,165,339 A | 1/1965 | Faccon et al. | |
| 3,276,796 A * | 10/1966 | Daniel | F16L 37/52 285/261 |

(Continued)

FOREIGN PATENT DOCUMENTS

| | | | | |
|---|---|---|---|---|
| CN | 106195484 A | 12/2016 | | |
| EP | 2829784 A1 * | 1/2015 | ............. | F16L 37/52 |

(Continued)

*Primary Examiner* — Matthew Troutman
*Assistant Examiner* — Fannie C Kee (57) ABSTRACT

A coupling assembly, to be flowed through by fluid, for coupling two components has a coupling element and a ball joint assembly with a female ball joint element, a male ball joint element, and a securing element. The female and male ball joint elements form a ball joint by form fit. The male ball joint element has a ball segment and the female ball joint element has an expandable ball segment. The ball segment of the male ball joint element engages the expandable ball segment so that the female ball joint element at least partially encloses the male ball joint element. The securing element contacts externally an outer contour of the female ball joint element. The coupling element forms one of the female and male ball joint elements. One of the two components forms the other one of the female and male ball joint elements.

9 Claims, 9 Drawing Sheets

(56) References Cited

U.S. PATENT DOCUMENTS

| | | | | |
|---|---|---|---|---|
| 3,695,645 A | * | 10/1972 | Mommsen | F16L 37/52 24/581.1 |
| 3,929,355 A | * | 12/1975 | Sljusar | F16L 27/04 285/308 |
| 3,995,889 A | * | 12/1976 | Carr | F16L 37/252 285/94 |
| 4,486,037 A | | 12/1984 | Shotbolt | |
| 4,678,211 A | | 7/1987 | Bateman et al. | |
| 9,683,687 B2 | | 6/2017 | Arigaya et al. | |
| 10,436,360 B2 | | 10/2019 | Eilert et al. | |
| 2016/0208966 A1 | | 7/2016 | Eilert et al. | |

FOREIGN PATENT DOCUMENTS

| | | | | |
|---|---|---|---|---|
| EP | 3211282 A1 | | 8/2017 | |
| EP | 3486596 A1 | | 5/2019 | |
| EP | 3974695 A1 | * | 3/2022 | F16L 37/52 |
| FR | 2622671 A1 | * | 5/1989 | F16L 37/52 |
| GB | 1604235 A | * | 12/1981 | F16L 27/06 |
| WO | WO-2018077473 A1 | * | 5/2018 | F16L 27/04 |

\* cited by examiner

COUPLING ASSEMBLY FOR PIPES

CROSS-REFERENCE TO RELATED APPLICATION

This application claims a priority date of 11 Dec. 2020 based on prior filed German patent application No. DE 10 2020 133 094.4, the entire contents of the aforesaid German patent application being incorporated herein by reference to the fullest extent permitted by the law.

BACKGROUND OF THE INVENTION

The invention concerns a coupling assembly for pipes, in particular for producing a quasi rigid pipe connection.

DE 10 2015 000 341 A1 discloses a joint assembly for pipes with two joint sections, wherein one of the two joint sections engages the other one of the two joint sections. In addition, the joint assembly comprises a locking body that engages at least in sections between the joint sections and interacts with a locking contour at one of the joint sections and with a blocking section of the other joint section in such a way that a relative movement between the joint sections can be at least limited. In this context, at the joint sections a guide device is provided such that the two joint sections can be joined in a defined rotatory position relative to each other and/or it is provided that the locking contour of one joint section comprises a plurality of cutouts at its inner wall that correspond with the locking elements of the locking body.

SUMMARY OF THE INVENTION

It is an object of the invention to provide an inexpensive and stable coupling assembly between two components which can compensate tolerances between the components to be connected.

A further object of the invention is to provide a method for coupling two components that can be performed in a simple and inexpensive way.

A further object of the invention is to provide a ball joint element for a stable coupling assembly.

The aforementioned object is solved by a coupling assembly which comprises a coupling element and a ball joint assembly with a female ball joint element, a male ball joint element, and a securing element. The coupling element forms one of the ball joint elements at a first end section. One of the components to be coupled forms the other one of the ball joint elements. The male ball joint element comprises a ball segment which engages an expandable ball segment of the female ball joint element so that the female ball joint element at least partially encloses the male ball joint element. The securing element is contacting externally an outer contour of the female ball joint element.

The further object is solved by a method for coupling two components, wherein a ball joint element of a coupling element and a ball joint element of one of the components are coupled with each other by form fit. A ball segment of a male ball joint element engages an expandable ball segment of the female ball joint element so that the female ball joint element at least partially encloses the male ball joint element and the ball joint elements form a ball joint assembly. A securing element is pushed externally onto an outer contour of the female ball joint element.

The further object is solved by a ball joint element in which a securing element is provided that, when reaching the end position after pushing onto a complementary ball joint element, can be slipped across the expansion region and at least stabilize a form fit connection of the coupling assembly.

Beneficial configurations and advantages of the invention result from the further claims, the description, and the drawing.

A coupling assembly between two components is proposed which can be flowed through by a fluid, with a coupling element and at least one ball joint assembly. The ball joint assembly comprises a female ball joint element, a male ball joint element, and a securing element. The coupling element forms one of the ball joint elements at the first end region. One of the components to be coupled forms the other one of the ball joint elements. The ball joint elements form the ball joint by form fit.

The male ball joint element comprises a ball segment which engages an expandable ball segment of the female ball joint element so that the female ball joint element at least partially encloses the male ball joint element. The securing element contacts externally an outer contour of the female ball joint element.

Since the securing element contacts externally an outer contour of the female ball joint element, an undesirable opening of the ball joint can advantageously be prevented by form fit.

The male ball joint element engages the female ball joint element. In doing so, the male ball joint element comprises at least one rotational degree of freedom in the female ball joint element so that the ball joint elements can be rotated relative to each other. Due to this configuration of the ball joint assembly of the coupling assembly, a minimal rotation of the ball joint elements can be enabled which is preferably between 0° and 5°, particularly preferred between 0° and 3°. In this way, tolerances between the component and the coupling element can be compensated in an advantageous manner. For example, axis errors between the component and the coupling element can be compensated. Due to the ball joint elements, an angle compensation between the coupling element and the component can be produced. In addition, tolerances and axis errors between the components to be coupled between which the ball joint elements are arranged can be compensated also due to the ball joint elements. In addition, an angle compensation between the components can be realized due to the ball joint elements. The ball-shaped geometry can prevent transverse forces. In this way, the occurring loads can be distributed uniformly in the coupling assembly. Moreover, due to the integrated ball joint assembly, installation space for the coupling assembly can be reduced. In addition, the female ball segment can be embodied as one piece which is expanded during assembly and which after assembly encloses an outer contour of the male ball segment. In this way, a curved inner contour of the female ball joint element at least partially contacts a curved surface of the male ball joint element.

In an advantageous manner, the securing element can be designed as a steel ring. Steel rings are shape-stable even at high pressures and temperature fluctuations. The securing element reinforces and stiffens by form fit the connection between the ball joint elements from the exterior. In addition, the securing element can prevent or at least make it more difficult that the female ball segment of the female ball joint element can expand accidentally. In this way, in an advantageous manner, an accidental release of the form fit and/or friction fit connection between the male ball joint element and the female ball joint element can be made more difficult or prevented. Optionally, also materials with high strength, for example, plastic rings with high glass fiber contents or the like, can be employed.

The coupling assembly is particularly suitable for producing a rigid or quasi rigid connection between pipes, for example, in case of charge air conduits in motor vehicles or connections without dynamic movement loads, in particular with high temperature and pressure loads of the connection. The coupling assembly can easily compensate by the integrated ball joint assembly the movements produced upon installation or by slight positional changes between connecting points. In this context, length changes of a few millimeters as well as angle errors of a few degrees between the ball joint elements can be compensated without one-sided tension introduction into the ball joint assembly.

According to a beneficial embodiment, the female ball joint element can comprise at least one slot extending in axial direction. Due to the at least one slot, widening or expanding of the ball segment during assembly of the ball joint assembly can be facilitated. A plurality of slots can divide the ball segment into a plurality of sections which can be moved relative to each other. The sections can be connected to each other at an end region. Advantageously, the slots can be arranged equidistantly to each other. Due to the sections, also a close contact of the ball segment of the female ball joint element at the outer contour of the ball segment of the male ball joint element can be facilitated. The securing element can be arranged over the sections of the ball segment and, in this way, a stability of the female ball joint element can be improved and an accidental widening or expanding of the ball segment can be prevented. Optionally or additionally, the male ball joint element can comprise at least one reinforcement rib extending in axial direction and projecting radially. The at least one reinforcement rib can make more difficult or prevent a deformation of the male ball joint element.

According to a beneficial embodiment, the at least one reinforcement rib can project radially away from the ball segment of the male ball joint element and engage the at least one slot of the female ball joint element and form an anti-rotation device. In the connected state of the ball joint element, a rotation between the two ball joint elements about an axis of rotation which extends in axial direction can be made more difficult or completely prevented due to the anti-rotation device. In this context, the female ball joint element can comprise a plurality of slots and the male ball joint element can comprise a plurality of reinforcement ribs wherein each reinforcement rib can have a slot correlated therewith. Due to the slots extending in axial direction, the sections of the ball segment can comprise legs extending in axial direction between which the radially projecting reinforcement ribs or a radially projecting pin of the male ball joint element can be guided. Such a construction can be easily produced and enables a reliable guiding of the reinforcement ribs or of the pins by the slots. In this way, connecting the ball joint elements can be facilitated. Moreover, with the aid of the reinforcement ribs or the pins, after the connection of the ball joint elements has been produced, it can be easily recognized from the exterior whether the ball joint elements are correctly positioned and properly joined even though in the mounted state of the ball joint assembly the male ball joint element practically is immersed completely in the female ball joint element.

According to a beneficial embodiment, the female ball joint element can comprise a stop for the securing element at the outer contour. The stop can be embodied as a thickened portion and/or as a bead and/or as a projection and/or as a shoulder. In this context, a plurality of stops that are spaced apart from each other can be arranged in circumferential direction at the outer contour. Optionally, a continuous stop can be arranged circumferentially at the outer contour. The at least one stop can prevent, or make more difficult, that the securing element moves to an undesirable position. In this way, it can be ensured that the securing element acts in the region of the ball joint assembly which requires the reinforcement and/or the stiffening action. In addition, an accidental release of the ball joint assembly is made more difficult or prevented due to the fixation of the securing element in a predetermined position by the at least one stop.

According to a beneficial embodiment, the coupling element can form a coupling region to a further component at a second end region. In this context, a connection element interacting with the other component can be embodied as one piece with the coupling region of the coupling element. Alternatively, the connection element interacting with the other component can be detachably or fixedly connectable to the coupling region.

According to a beneficial embodiment, the coupling region of the second end region can be embodied as a female coupling element which receives the connection element, wherein the second end region comprises a receptacle for a locking element which engages the receptacle and connects the female coupling element to the connection element with friction fit and/or form fit. The connection element can be designed as a quick coupling element which engages a female coupling element that is embodied as a quick coupling connection socket. The locking element can be designed as a locking clip which contacts the outer contour of the coupling element and engages the receptacles in the coupling region and, in this way, contacts an outer contour of the connection element or engages receptacles of the connection element. Due to this form fit and/or friction fit connection, the connection element can be connected to the coupling element so as to be quickly and easily detachable. Other known connection assemblies are also possible between the coupling region of the coupling element and the connection element, for example, a bayonet closure or other locking or clamping connections. In this context, a rigid locking connection between the coupling element and the connection element or the quick coupling element can be combined with a ball joint assembly.

According to a beneficial embodiment, the coupling element can form the female ball joint element of the ball joint assembly at the first end region and comprise an inwardly positioned contact surface. The male ball joint element can be arranged between the inwardly positioned contact surface and an inner contour of the female ball joint element. In this context, the male ball joint element contacts with an inner contour the inwardly positioned contact surface wherein a seal element is arranged between the inner contour of the male ball joint element and the contact surface. The inner contour of the male ball joint element and/or the contact surface can have a cutout in which the seal element is arranged. Due to the cutout, the seal element can be fixed in a predetermined position. Due to the seal element, a fluid-tight coupling between the component and the coupling element can be provided. The receptacle for the seal element can be designed as a groove which extends continuously and circumferentially at the inner contour of the male ball joint element and/or at the contact surface. The receptacle can be arranged in this context such that its center axis is congruent to an axis of the ball joint assembly which extends through a center point of the ball joint assembly, so that the receptacle is perpendicular to the axial direction. Due to this arrangement, only minimal distance changes between the sealing surfaces can occur in case of angle changes in the ball joint assembly and a load of the seal element can be reduced in an advantageous manner. The seal element can be configured as an O-ring, lip seal, shaped seal or the like.

According to a beneficial embodiment, the inwardly positioned contact surface and the coupling element can be designed as one piece. In this context, the contact surface is arranged captively in a defined position within the coupling element.

According to an alternative embodiment, the inwardly positioned contact surface can be formed by a surface of the connection element. In this way, the male ball joint element is arranged between the female ball joint element and the connection element. Due to this arrangement, a seal arrangement between the coupling element and the connection element can be omitted because the seal element between the connection element and the male ball joint element also takes over the seal function. In this way, components and/or parts can be saved so that costs, weight, and installation space for the coupling assembly can be reduced in an advantageous manner.

A method for coupling two components is proposed wherein a coupling assembly between the two components can be flowed through by a fluid. In a method step, a ball joint element of a coupling element and a ball joint element of one of the components are coupled with each other by form fit wherein a ball segment of a male ball joint element engages an expandable ball segment of the female ball joint element so that the female ball joint element at least partially encloses the male ball joint element and the ball joint elements form a ball joint assembly. In a further method step, a securing element is pushed externally onto an outer contour of the female ball joint element. In an alternative method step, a connection element which can be coupled to a further component is connected to a coupling region of the coupling element. The method can be performed intuitively. In addition, the male ball joint element must not be inserted at a predetermined angle into the female ball joint element so that the connection of the ball joint elements can be made easier. In addition, a minimal number of components and parts is required. Due to the connection element and the coupling region, the coupling element can be coupled with the other component. This coupling or connection assembly can be designed rigidly. A tolerance compensation between the components or between the components and the coupling element can be realized by the ball joint assembly.

According to a further aspect of the invention, a ball joint element is proposed in which a securing element is provided that, when reaching the end position after pushing onto a complementary ball joint element, can be slipped across the expansion region and at least stabilizes a form fit connection of the coupling assembly. Advantageously, an accidental opening of the connection can be prevented by the form fit.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

In the Figures, same or same-type components are identified with same reference characters. The Figures show only examples and are not to be understood as limiting.

FIGS. 1 to 4 show a first embodiment of a coupling assembly 100.

FIGS. 5 to 9 show a second embodiment of a coupling assembly 100.

The illustrated coupling assemblies 100 can be arranged in particular at end regions of a pipe 400, for example, a charge air pipe of an internal combustion engine. The pipe 400 can be connected at its end regions by the corresponding coupling assembly 100 to the pipe piece 500, respectively. The pipe connection is, as intended, quasi rigid, i.e., it is not provided for dynamic movements in operation but is substantially immobile. The coupling assembly 100 can also be employed for other assemblies that are flowed through by a fluid in which two components 400, 500 are coupled to each other. In particular, the components can be pressure-loaded.

As is further apparent from FIGS. 1 to 9, the illustrated embodiments of the coupling assembly 100 each comprise a coupling element 110 and at least one ball joint assembly 200. The ball joint assembly 200 comprises a female ball joint element 220, a male ball joint element 240, and a securing element 260. The ball joint elements 220, 240 and the coupling element 110 are embodied symmetrically to a center axis and can be flowed through by a fluid in axial direction X. Due to the cavity in the ball joint elements 220, 240 and the coupling element 110, these components each have an outer contour 226, 243 and an inner contour 223, 248.

As is further apparent from FIGS. 1 to 9, the coupling element 110 forms at a first end region 112 one of the ball joint elements 220, 240 and one of the components 400 forms the other one of the ball joint elements 220, 240. In the illustrated embodiments, the coupling element 110 forms the female ball joint element 220 and the component 400, embodied as end region of the pipe 400, forms the male ball joint element 240. In an alternative embodiment, not illustrated, the coupling element 110 can form the male ball joint element 240 and the component 400, embodied as end region of the pipe 400, the female ball joint element 220.

As is further apparent from FIGS. 1 to 9, the ball joint elements 220, 240 form the ball joint by form fit. The male ball joint element 240 comprises a ball segment 242 which engages an expandable ball segment 222 of the female ball joint element 220 so that the female ball joint element 220 encloses at least partially the male ball joint element 240. The securing element 260 contacts externally the outer contour 226 of the female ball joint element 220. The outer contour 226 of the female ball joint element 220 comprises a stop 270 for the securing element 260 which can be clearly seen in FIGS. 1, 5, 6. This stop 270 can be a shoulder projecting in radial direction away from the outer contour 226 or a thickened portion. Due to this stop 270, the securing element 260 can be fixed in a predetermined position. The securing element 260 prevents an accidental widening or expanding of the ball segment 222 of the female ball joint element 220. In this way, an accidental sliding of the ball segment 242 of the male ball joint element 220 out of the ball segment 222 of the female ball joint element 220 is made more difficult.

As is further apparent from FIGS. 1 to 9, the ball joint assembly 200 enables a length compensation of a few millimeters as well as a compensation of angle errors of a few degrees between the ball joint elements. The ball joint elements 220, 240 can thus be rotated relative to each other such that angles between 0° and 5°, particularly preferred between 0° and 3°, can be compensated.

Figure 2:
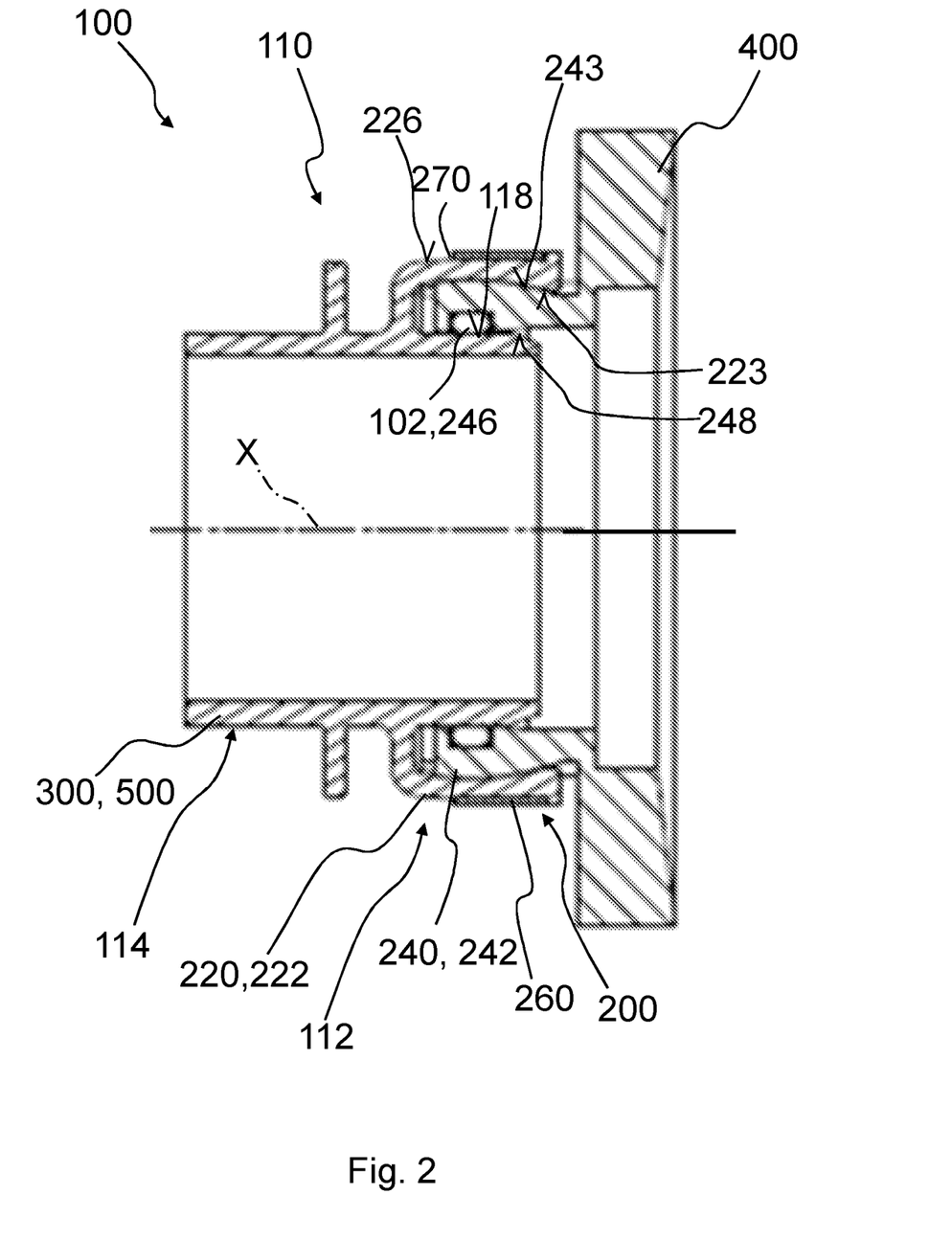
FIG. 2 shows a section through the coupling assembly of FIG. 1 in a neutral position.
Figure 7:
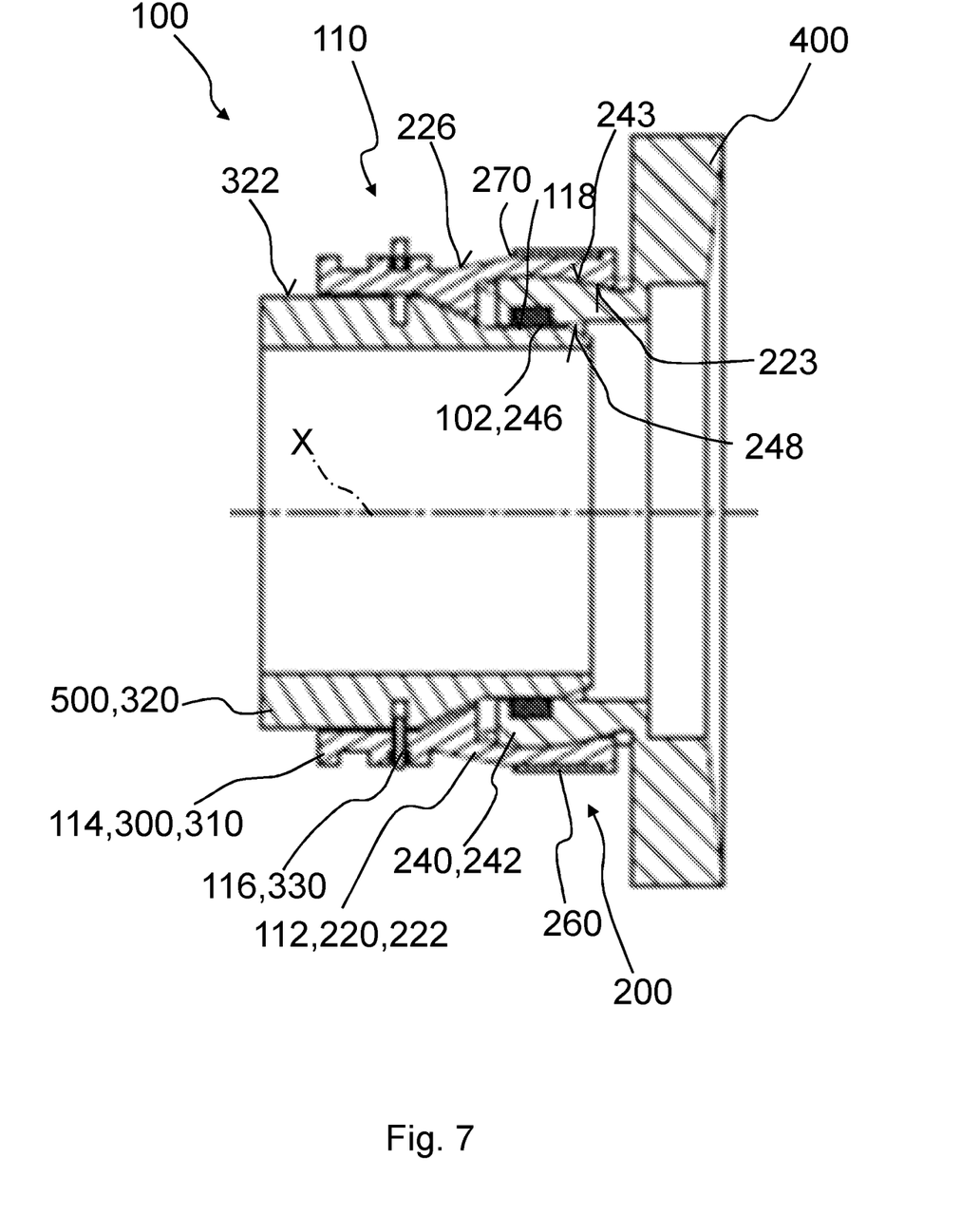
FIG. 7 shows a section through the coupling assembly of FIGS. 5 and 6 in a neutral position with a connection element in the connected state.

As is further apparent from FIGS. 2 and 7, the center axes of the ball joint elements 220, 240 of the coupling element 110 and of the component 400 are arranged congruently to each other. They extend parallel to the axial direction X. The ball segment 242 of the male ball joint element 240 is immersed uniformly in the ball segment 222 of the female ball joint element 220.

Figure 3:
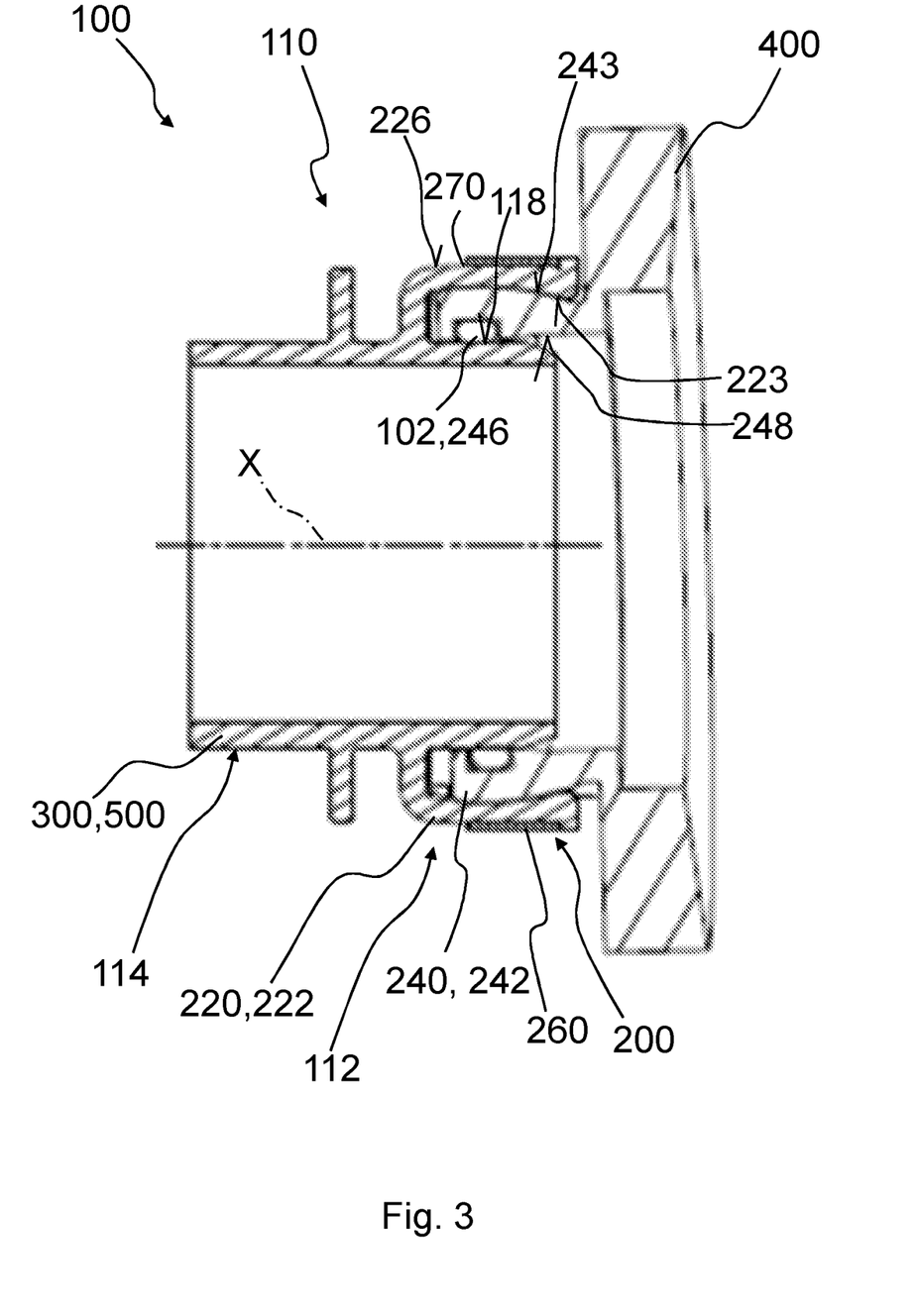
FIG. 3 shows a section through the coupling assembly of FIG. 1 in a first angled position.
Figure 8:
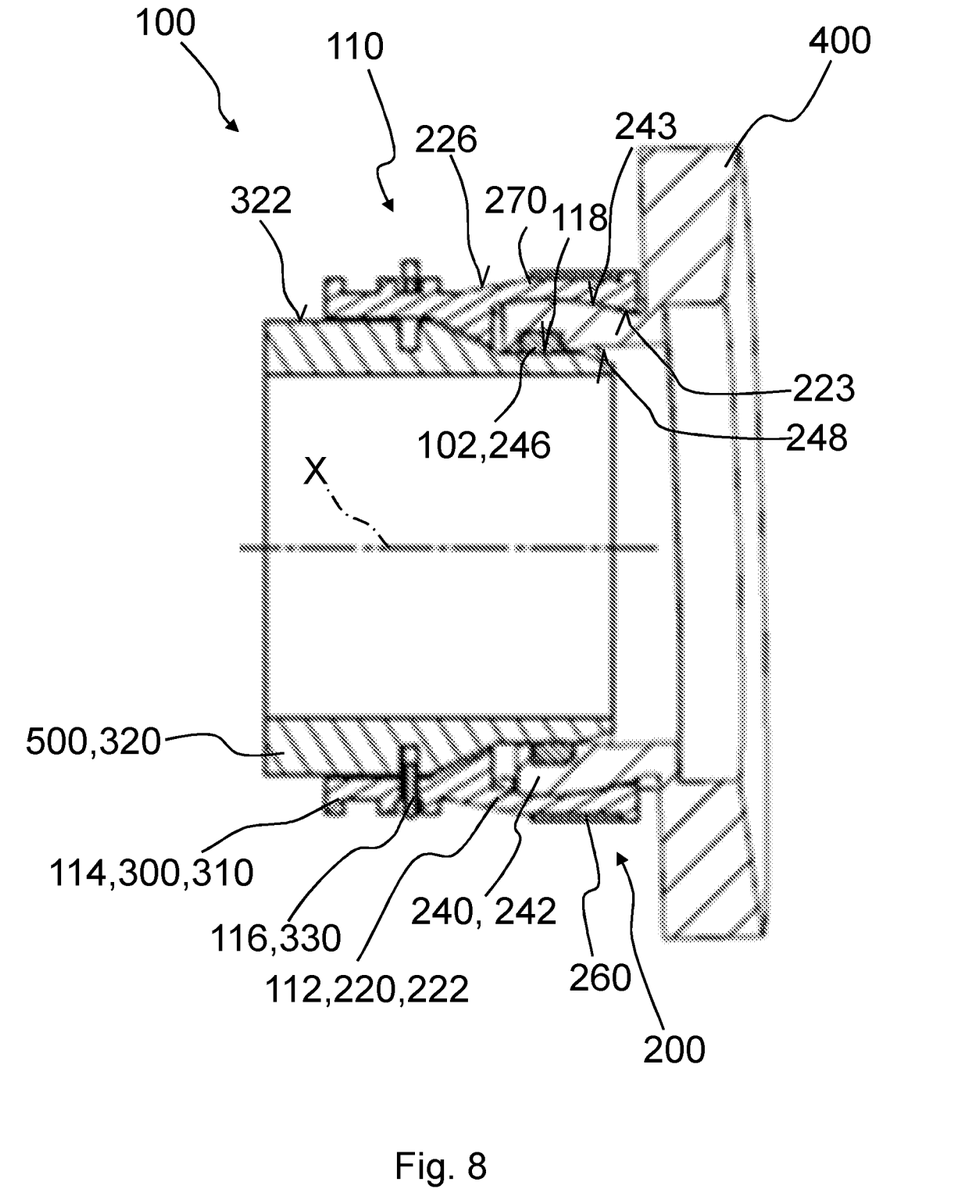
FIG. 8 shows a section through the coupling assembly of FIGS. 5 and 6 in the first angled position with a connection element in the connected state.

As is further apparent from FIGS. 3 and 8, the center axes of the male ball joint element 240 and of the coupling element 110 in a first angled position comprise an angle relative to each other. The ball segment 242 of the male ball joint element 240 is immersed deeper in an upper region in the ball segment 222 of the female ball joint element 220 than in a lower region.

Figure 4:
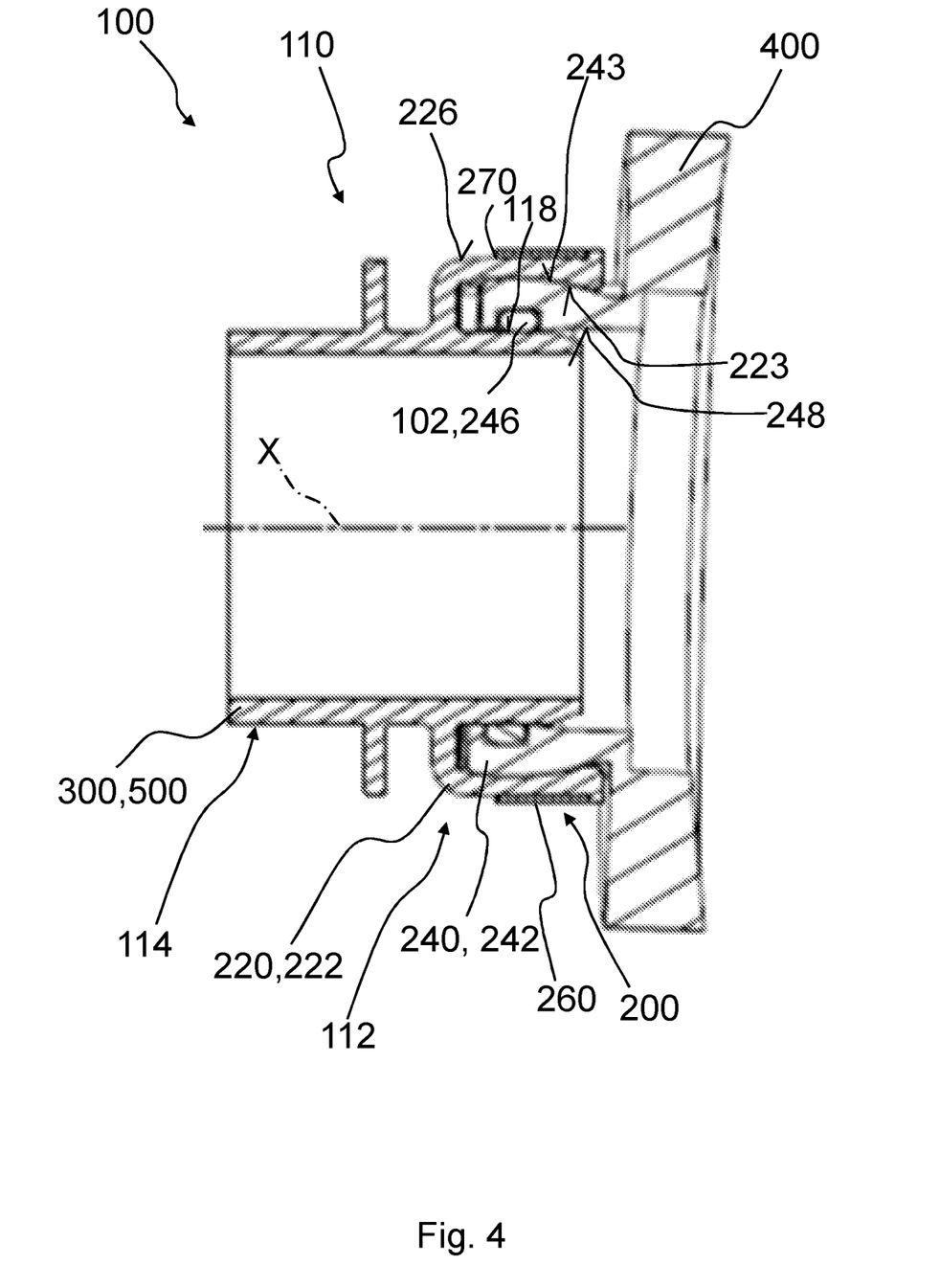
FIG. 4 shows a section through the coupling assembly of FIG. 1 in a second position angled opposite to the first position.
Figure 9:
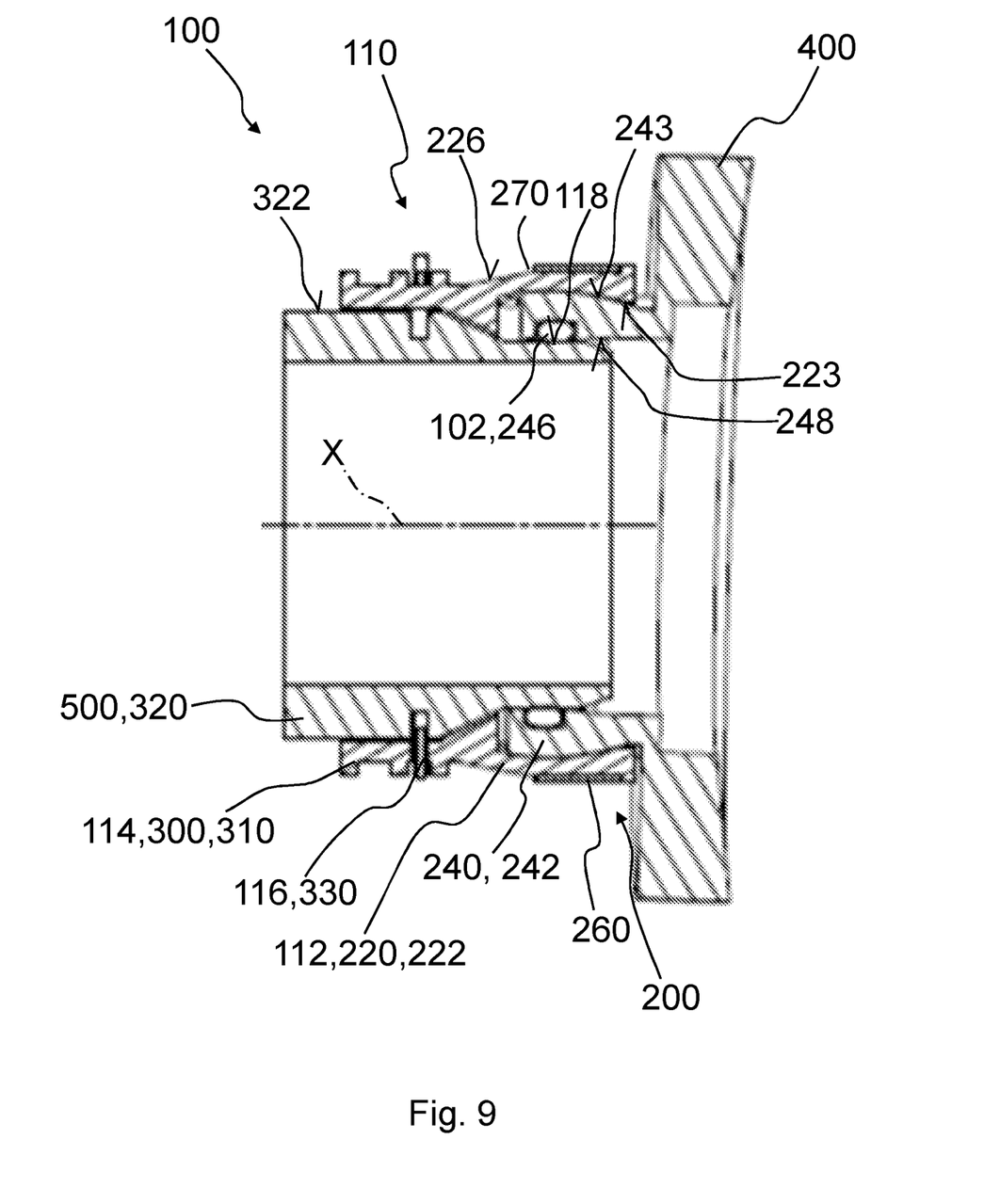
FIG. 9 shows a section through the coupling assembly of FIGS. 5 and 6 in a second position angled opposite to the first position with a connection element in the connected state.

As is further apparent from FIGS. 4 and 9, the center axes of the male ball joint element 240 and of the coupling element 110 in a second angled position also comprise an angle relative to each other. The ball segment 242 of the male ball joint element 240 is immersed deeper in a lower region in the ball segment 222 of the female ball joint element 220 than in the upper region.

The angled positions which are illustrated in the FIGS. 3, 4, 8, and 9 corresponds respectively to an end position with maximum tilting. The ball joint assembly 200 can assume any intermediate position that is not illustrated. In addition, also an angled positioning in other spatial directions is possible.

Figure 1:
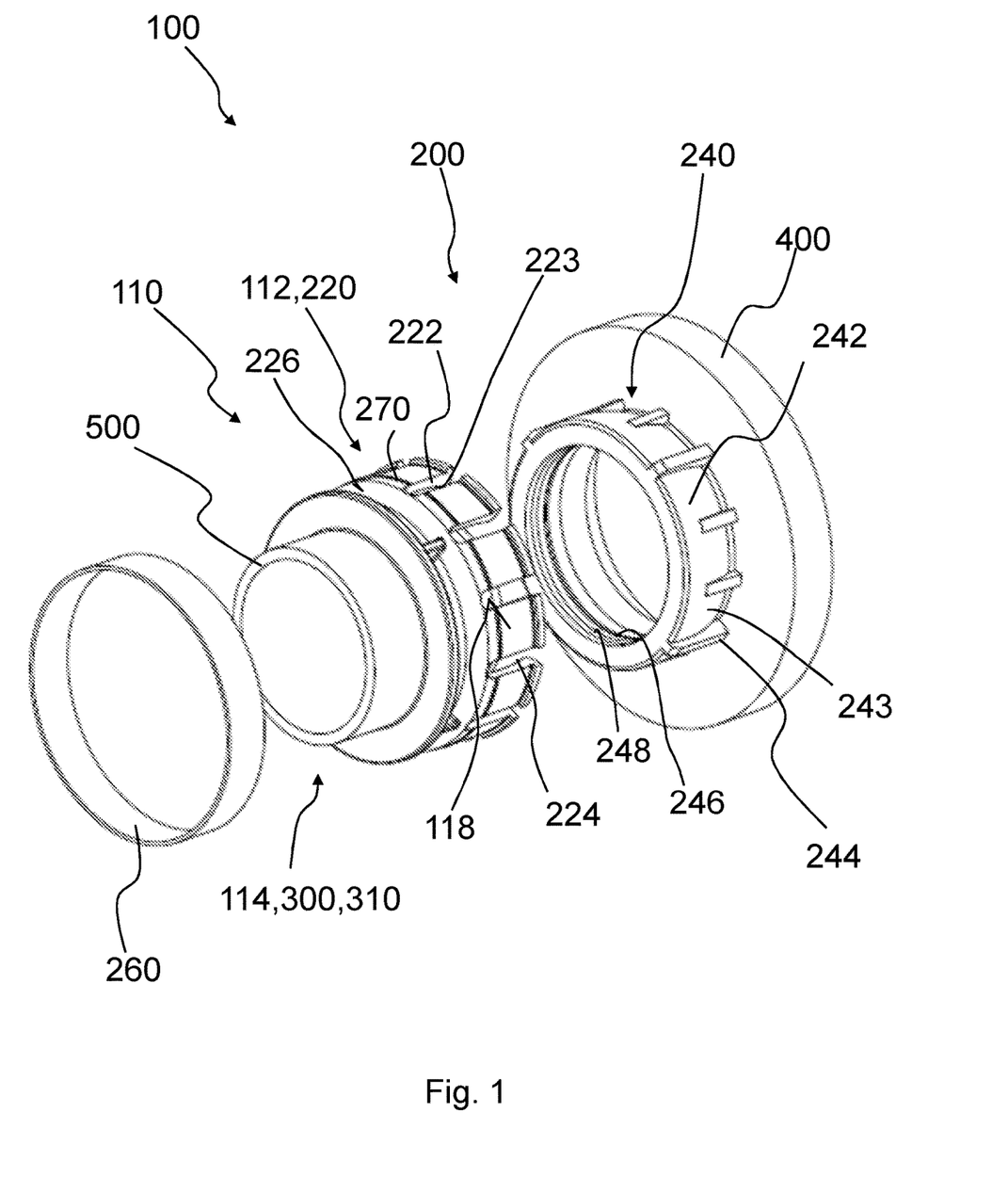
FIG. 1 shows an exploded illustration of a coupling assembly according to a first embodiment of the invention.
Figure 5:
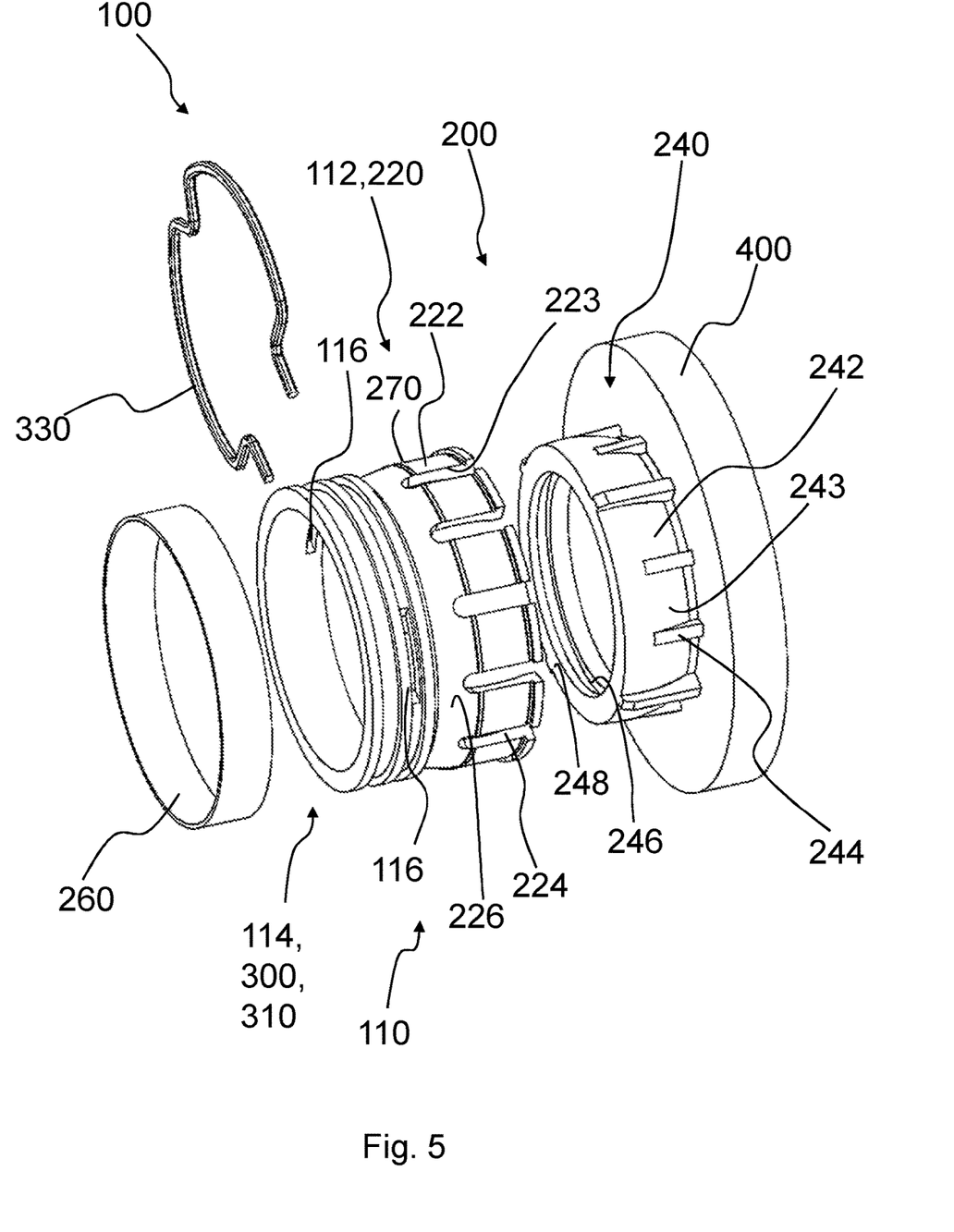
FIG. 5 shows an exploded illustration of a coupling assembly according to a second embodiment of the invention.
Figure 6:
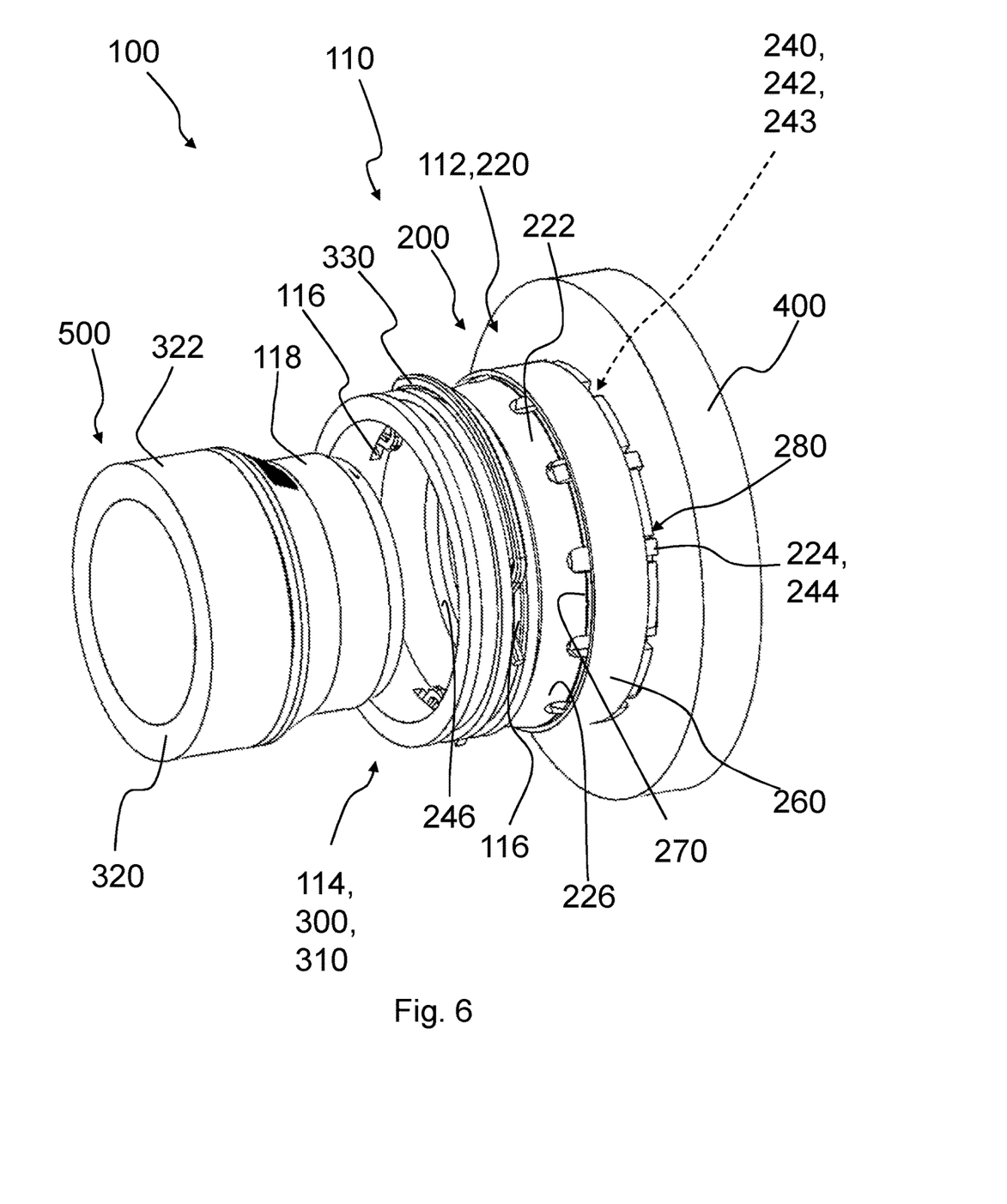
FIG. 6 shows a perspective illustration of the coupling assembly of FIG. 5 with a detachably arranged connection element.

As is further apparent from FIGS. 1, 5, and 6, the female ball joint element 220 comprises in the illustrated embodiments a plurality of slots 224 extending in axial direction X. The male ball joint element 240 comprises a plurality of reinforcement ribs 244 extending in axial direction X. The reinforcement ribs 244 project radially away from the ball segment 242 of the male ball joint element 240 and engage respectively a corresponding slot 224 of the female ball joint element 220. In this way, an anti-rotation device 280 is formed (see FIG. 6). The anti-rotation device prevents a rotation of the ball joint elements 220, 240 about an axis of rotation which is parallel to axial direction X. In addition, the reinforcement ribs 244 are guided in the slots 224 so that connecting the ball joint elements 220, 240 can be facilitated.

In the illustrated embodiments, the ball segment 222 of the female ball joint element 220 comprises, due to the slots 224, a plurality of regions which can be moved independently of each other. In this way, expanding and widening of the ball segment 222 upon insertion of the ball segment 242 of the male ball joint element 240 is facilitated. In addition, as is further apparent from FIG. 6, it can be easily checked due to the slots 224 and the reinforcement ribs 244 that are visible therein whether the male ball joint element 240 is connected correctly to the female ball joint element 220. In an alternative embodiment, not illustrated, the male ball joint element 240 can comprise, instead of the reinforcement ribs 244, also other suitable elements which engage the slots 224. The securing element 260 covers in the illustrated embodiments the slots 224 almost completely. In an alternative embodiment, not illustrated, the securing element 260 can also be narrower or wider and accordingly cover the slots more or less.

As is further apparent from FIGS. 1 to 9, the coupling element 110 forms at a second end region 114 a coupling region 300 to a further component 500. The component 500 is embodied as a pipe 500 and can be embodied in an alternative embodiment to be longer than in the illustrated embodiments. In addition, the pipe 500 can be connected by suitable means to further pipes.

As is further apparent from FIGS. 1 to 4, the coupling region 300 of the first embodiment is embodied as a pipe 500. Tolerances between the pipe 500 and the end region of the pipe 400 are compensated by the ball joint assembly 200. Since the pipe 500 and the coupling element 110 are embodied as one component, only a sealing action of the coupling element 110 is required. For this purpose, the first end region 112 of the coupling element 110 comprises an inwardly positioned contact surface 118. The inwardly positioned contact surface 118 and the coupling element 110 are embodied together as one piece. The male ball joint element 240 is at least partially arranged between the inwardly positioned contact surface 118 and an inner contour 223 of the female ball joint element 220 and contacts with its inner contour 248 the contact surface 118. Between the inner contour 248 of the male ball joint element 240 and the contact surface 118, a seal element 102 is arranged. In the illustrated embodiment, the inner contour 248 of the male ball joint element 240 comprises a cutout 246 in which the seal element 102 is arranged. In an alternative embodiment, the cutout 246 can also be arranged at the contact surface 118. In addition, the arrangement of a plurality of seal elements 102 and of a plurality of corresponding cutouts is conceivable.

As is further apparent from FIGS. 5 to 9, in the second embodiment the coupling region 300 of the second end region 114 is embodied as a female coupling element 310 which receives a connection element 320. In an alternative embodiment, the coupling region 300 of the second end region 114 can form a male coupling element. The second end region 114 comprises in addition a plurality of receptacles 116 for a locking element 330 which engages the receptacles 116 and connects the female coupling element 310 to the connection element 320 by friction fit and/or form fit. The locking element 330 is embodied as a locking clip. However, other suitable locking elements 330 and other suitable connections are conceivable. The connection element 320 is formed at an end region of the pipe 500. The connection element 320 and the female coupling element 310 can be standardized. The coupling at the second end region 114 is a rigid coupling. Tolerances between the pipe 500 and the end region of the pipe 400 are compensated by the ball joint assembly 200.

As is further apparent from FIGS. 5 to 9, the second embodiment also comprises a seal arrangement wherein the first end region 112 of the coupling element 110 comprises an inwardly positioned contact surface 118. The inwardly positioned contact surface 118 is formed by a surface 322 of the connection element 320. In this way, the male ball joint element 240 is arranged at least partially between the connection element 320 and the female ball joint element 220. In this way, only one seal arrangement is required. The male ball joint element 240 is at least partially arranged between the inwardly positioned contact surface 118 and the inner contour 223 of the female ball joint element 220 and contacts with its inner contour 248 the contact surface 118. The seal element 102 is arranged between the inner contour 248 of the male ball joint element 240 and the contact surface 118. In the illustrated second embodiment, the inner contour 248 of the male ball joint element 240 comprises a cutout 246 in which the seal element 102 is arranged. In an alternative embodiment, the cutout 246 can also be arranged at the contact surface 118 of the connection element 320. In addition, the arrangement of a plurality of seal elements 102 and of a plurality of corresponding cutouts is conceivable.

A method, not illustrated, for coupling two components comprises a method step in which a ball joint element 220, 240 of a coupling element 110 and a ball joint element 220, 240 of one of the components 400 are connected to each other by form fit. In this context, a ball segment 242 of a male ball joint element 240 engages an expandable ball segment 222 of the female ball joint element 220 so that the female ball joint element 220 at least partially encloses the male ball joint element 240 and the ball joint elements 220, 240 form a ball joint assembly 200. In a further method step, a securing element is pushed externally onto an outer contour 226 of the female ball joint element 220. In an alternative embodiment, a connection element 320 that can be coupled to a further component 500 is connected to a coupling region 300 of the coupling element 110.

What is claimed is:

1. A coupling assembly for coupling two components and configured to be flowed through by a fluid, the coupling assembly comprising:
    a coupling element;
    a ball joint assembly comprising a female ball joint element, a male ball joint element, and a securing element, wherein the female and male ball joint elements form a ball joint by form fit;
    wherein the male ball joint element comprises a ball segment and wherein the female ball joint element comprises an expandable ball segment, wherein the ball segment of the male ball joint element engages the expandable ball segment of the female ball joint element so that the female ball joint element at least partially encloses the male ball joint element;
    wherein the securing element contacts externally an outer contour of the female ball joint element;
    wherein the coupling element comprises a first end region and forms at the first end region one of the female and male ball joint elements; and
    wherein a first one of the two components forms the other one of the female and male ball joint elements;
    wherein the coupling element comprises a second end region arranged opposite the first end region and forming a coupling region configured to couple a second one of the two components; and
    wherein the coupling assembly further comprises a connection element and a locking element, wherein the coupling region is a female coupling element configured to receive the connection element, wherein the second end region comprises a receptacle, wherein the locking element engages the receptacle and locks the female coupling element at the connection element by friction fit and/or form fit.

2. The coupling assembly according to claim 1, wherein the female ball joint element comprises at least one slot extending in an axial direction of the coupling assembly.

3. The coupling assembly according to claim 1, wherein the male ball joint element comprises at least one reinforcement rib extending in an axial direction of the coupling assembly.

4. The coupling assembly according to claim 1, wherein the female ball joint element comprises at least one slot extending in an axial direction of the coupling assembly and wherein the male ball joint element comprises at least one reinforcement rib extending in the axial direction of the coupling assembly.

5. The coupling assembly according to claim 4, wherein the at least one reinforcement rib projects radially away from the ball segment of the male ball joint element and engages the at least one slot of the female ball joint element and forms an anti-rotation device.

6. The coupling assembly according to claim 1, wherein the female ball joint element comprises a stop for the securing element, wherein the stop is arranged at the outer contour.

7. The coupling assembly according to claim 1, wherein:
    the coupling element forms the female ball joint element at the first end region and comprises an inwardly positioned contact surface;
    the male ball joint element is arranged at least partially between the inwardly positioned contact surface and an inner contour of the female ball joint element;
    the male ball joint element comprises an inner contour contacting the inwardly positioned contact surface of the coupling element;
    a seal element is arranged between the inner contour of the male ball joint element and the inwardly positioned contact surface of the coupling element; and
    the inner contour of the male ball joint element comprises a cutout and the seal element is arranged in the cutout.

8. The coupling assembly according to claim 7, wherein the inwardly positioned contact surface and the coupling element are embodied together as one piece.

9. The coupling assembly according to claim 7, wherein the coupling element comprises a connection element and wherein the inwardly positioned contact surface is formed by a surface of the connection element.

* * * * *